US006884366B2

(12) United States Patent
Otaki et al.

(10) Patent No.: US 6,884,366 B2
(45) Date of Patent: Apr. 26, 2005

(54) PROCESS FOR PRODUCING OXYGEN ABSORBING POLYAMIDE RESIN COMPOSITION AND OXYGEN ABSORBING POLYAMIDE RESIN COMPOSITION PRODUCED BY THE PROCESS

(75) Inventors: Ryoji Otaki, Kanagawa (JP); Sotaro Hiramatsu, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 99 days.

(21) Appl. No.: 10/384,733

(22) Filed: Mar. 11, 2003

(65) Prior Publication Data

US 2003/0168631 A1 Sep. 11, 2003

(30) Foreign Application Priority Data

Mar. 11, 2002 (JP) ...................................... 2002-065462

(51) Int. Cl.$^{7}$ ............................ C09K 3/00; C08K 3/32
(52) U.S. Cl. .................................. 252/188.28; 524/706
(58) Field of Search .................................... 252/188.28

(56) References Cited

U.S. PATENT DOCUMENTS 2,705,227 A * 3/1955 Stamatoff ................... 523/307
3,260,697 A * 7/1966 Babler ........................ 524/711
3,330,802 A * 7/1967 Ciceri et al. ................ 524/706
3,553,161 A * 1/1971 Hermann et al. ............. 524/99
3,594,346 A * 7/1971 Hermann et al. ........... 524/139
4,237,034 A * 12/1980 Tomka et al. ............... 524/130
5,034,252 A * 7/1991 Nilsson et al. ............. 428/35.8
5,302,430 A 4/1994 Ardéchir et al.
6,689,437 B1 * 2/2004 Ubara et al. ............... 428/35.7

FOREIGN PATENT DOCUMENTS

EP 0 301 719 2/1989
EP 0 542 512 5/1993
WO WO 00-058404 A1 * 10/2000 ......... C08L/101/00

OTHER PUBLICATIONS

European Search Report dated Jul. 29, 2003 for EP 03 00 4919.

* cited by examiner

*Primary Examiner*—Matthew A. Thexton
(74) *Attorney, Agent, or Firm*—Antonelli, Terry, Stout & Kraus, LLP

(57) ABSTRACT

In the process for producing an oxygen absorbing polyamide resin composition of the present invention, a diamine component containing 70 mol % or higher of m-xylylenediamine is polycondensed with a dicarboxylic acid component containing 50 mol % or higher of adipic acid in the presence of a phosphorus compound. A compound or complex containing at least one metal selected from the group consisting of transition metals of Group VIII of the Periodic Table, manganese, copper and zinc is added to reaction system either prior to initiation of the polycondensation reaction or during the polycondensation reaction such that a ratio (P/M) of a concentration of phosphorus P (mmol/g) in the phosphorus compound contained in the polyamide resin composition to a concentration of the metal M (mmol/g) in the polyamide resin composition is 0.02 to 1.0.

22 Claims, No Drawings

PROCESS FOR PRODUCING OXYGEN ABSORBING POLYAMIDE RESIN COMPOSITION AND OXYGEN ABSORBING POLYAMIDE RESIN COMPOSITION PRODUCED BY THE PROCESS

FIELD OF THE INVENTION

The present invention relates to a process for producing an oxygen absorbing polyamide resin composition, and an oxygen absorbing polyamide resin composition produced by the process. More particularly, the invention relates to a process for producing an oxygen absorbing polyamide resin composition having a stable quality which process comprises subjecting starting components to polycondensation reaction in the presence of a compound or complex containing at least one metal selected from the group consisting of transition metals of Group VIII of the Periodic Table, manganese, copper and zinc, and a phosphorus compound which are added in specific amounts, and an oxygen absorbing polyamide resin composition produced by the process.

RELATED ARTS

Some of metallic cans or glass bottles conventionally used as packaging containers having an excellent keeping property for their contents by inhibiting oxygen from entering thereinto from outside, have now been replaced with plastic containers made of gas barrier thermoplastic resins in view of processability and inexpensiveness. The gas barrier thermoplastic resins are required to show a low permeability to gaseous substances such as oxygen and carbon dioxide and easiness in processing as well as good transparency and mechanical strength. For this reason, as the gas barrier thermoplastic resins, there have been widely used especially ethylene-vinyl alcohol copolymer or polyamides produced by the polycondensation reaction between a diamine component composed mainly of m-xylylenediamine, and a dicarboxylic acid component composed mainly of adipic acid (hereinafter referred to merely as "nylon MXD6"). However, the packaging containers made of the gas barrier thermoplastic resins inevitably suffer from non-negligible amounts of gases penetrated thereinto from outside during long-term storage as compared to the conventional packaging containers made of metals or glass which are substantially completely free from gases penetrated thereinto from outside. In addition, when preserved under high humidity condition, the gas barrier thermoplastic resins for the packaging containers tend to undergo increase in amount of gases penetrated therethrough. Therefore, the packaging containers made of the gas barrier thermoplastic resins have problems such as poor long-term keeping property for their contents as compared to the conventional metallic cans and glass bottles.

There has been recently developed oxygen absorbing nylon MXD6 obtained by blending a small amount of transition metal compound in nylon MXD6. It has now been attempted to practically use the oxygen absorbing nylon MXD6 as a gas barrier material for packaging containers and packaging materials in order to absorb not only oxygen penetrated thereinto from outside but also residual oxygen remaining therein, thereby enhancing a keeping property for their contents as compared to those using the conventional gas barrier thermoplastic resins.

As methods for production of the oxygen absorbing nylon MXD6, there are known a method of producing master pellets by mixing thermoplastic resin pellets containing nylon MXD6 with a solution containing a transition metal compound and then evaporating a solvent from the resultant mixture to allow the transition metal compound to adhere onto nylon MXD6, as described in Japanese Patent Application Laid-open No. 2-500846; and a method of producing master pellets by mixing thermoplastic resin pellets containing nylon MXD6 with a transition metal compound, melt-kneading the resultant mixture, extruding the obtained melt into strands, and then pelletizing the strands, as described in Japanese Patent Application Laid-open No. 11-514385.

These conventional methods, however, require an additional step for producing master pellets of oxygen absorbing nylon MXD6 prior to the step for forming the packaging materials or packaging containers using the nylon MXD6. The additional step will cause loss of raw materials, resulting in problems such as poor yield of products.

In order to omit the additional step for producing the master pellets, there has been proposed such a molding method in which a mixture of the thermoplastic resin pellets containing nylon MXD6 and the transition metal compound is directly charged into a hopper of an injection-molding machine or the like. However, the transition metal compound that is different in shape and specific gravity from those of the thermoplastic resin pellets, is separated from the thermoplastic resin pellets with time, resulting in uneven concentration of the transition metal compound in final products and an unstable quality thereof as well as contamination of molded products and environment due to the transition metal compound scattered around the apparatus.

Further, when the nylon MXD6 is mixed and melt-kneaded with the transition metal compound, the molecular weight of the nylon MXD6 is more remarkably reduced as compared to the case where the nylon MXD6 containing no transition metal compound is melt-kneaded. Therefore, the resulting master pellets are not well controlled in molecular weight, melt viscosity, etc., thereby failing to obtain products having a stable quality.

Also, in order to solve the above problems, it is considered that after melt-kneading the nylon MXD6 with the transition metal compound, the melt-kneaded material is subjected to post solid-phase polymerization to appropriately control the molecular weight. However, this method results in further increase in number of steps.

SUMMARY OF THE INVENTION

An object of the present invention is to provide a process for producing a polyamide resin composition exhibiting an excellent oxygen absorbing property as well as an excellent dispersibility of a transition metal compound therein and a stable quality, and an oxygen absorbing polyamide resin composition produced by the process.

As the result of extensive studies in view of the above object, the present inventors have found that a polyamide resin composition having an excellent oxygen absorbing property is produced without reduction in its molecular weight and production reaction rate by subjecting starting components to polycondensation reaction in the presence of metal in the form of a metal compound or complex having a function of imparting an oxygen absorbing property to polyamide, and phosphorus having a function of accelerating the polycondensation reaction which are present at specific atomic ratios in the reaction system. The present invention has been accomplished on the basis of this finding.

Thus, the present invention provides the following aspects (1) to (3):

(1) a process for producing an oxygen absorbing polyamide resin composition by subjecting a diamine component containing 70 mol % or higher of m-xylylenediamine with a dicarboxylic acid component containing 50 mol % or higher of adipic acid to polycondensation reaction in the presence of a phosphorus compound, said process comprising:

adding a compound or complex containing at least one metal selected from the group consisting of transition metals of Group VIII of the Periodic Table, manganese, copper and zinc to reaction system either prior to initiation of the polycondensation reaction or during the polycondensation reaction such that a ratio (P/M) of a concentration of phosphorus P (mmol/g) in the phosphorus compound contained in the polyamide resin composition to a concentration of the metal M (mmol/g) in the polyamide resin composition is 0.02 to 1.0;

(2) the process as described in the above aspect (1) further comprising the step of subjecting the oxygen absorbing polyamide resin composition as produced to solid-phase polymerization at a temperature not less than a glass transition point but less than a melting point of the polyamide using a batch heat polymerizer; and (3) an oxygen absorbing polyamide resin composition produced by subjecting a diamine component containing 70 mol % or higher of m-xylylenediamine and a dicarboxylic acid component containing 50 mol % or higher of adipic acid to polycondensation reaction in the presence of a phosphorus compound, wherein a compound or complex containing at least one metal selected from the group consisting of transition metals of Group VIII of the Periodic Table, manganese, copper and zinc is added to reaction system either before initiation of the polycondensation reaction or during the polycondensation reaction such that a ratio (P/M) of a concentration of phosphorus P (mmol/g) in the phosphorus compound contained in the polyamide resin composition to a concentration of the metal M (mmol/g) in the polyamide resin composition is 0.02 to 1.0.

DETAILED DESCRIPTION OF THE INVENTION

The present invention is described in detail below.

In the process for production of the oxygen absorbing polyamide resin composition according to the present invention, the polyamide resin composition is produced by polycondensing a diamine component composed mainly of m-xylylenediamine with a dicarboxylic acid component composed mainly of adipic acid in the presence of a phosphorus compound and a compound or complex containing at least one metal selected from the group consisting of transition metals of Group VIII of the Periodic Table, manganese, copper and zinc which is added to the reaction system either prior to initiation of the polycondensation reaction or during the polycondensation reaction.

The diamine component used in the process of the present invention contains m-xylylenediamine as a main component in an amount of preferably 70 mol % or higher and more preferably 80 mol % or higher. When the content of m-xylylenediamine in the diamine component is 70 mol % or higher, the polyamide obtained by the polycondensation using such a diamine component exhibits excellent gas barrier property and oxygen absorbing property.

Examples of the other compounds usable in the diamine component include, but are not limited to, p-xylylenediamine, 1,3-bis(aminomethyl)cyclohexane, 1,4-bis(aminomethyl)cyclohexane, tetramethylenediamine, hexamethylenediamine, nonamethylenediamine and 2-methyl-1,5-pentadiamine.

The dicarboxylic acid component used in the process of the present invention contains adipic acid as a main component in an amount of preferably 50 mol % or higher and more preferably 70 mol % or higher. When the content of adipic acid in the dicarboxylic acid component is 50 mol % or higher, the polyamide obtained by the polycondensation using such a dicarboxylic acid component is prevented from undergoing deteriorated barrier property and excessive deterioration in crystallizability.

Examples of the other compounds usable in the dicarboxylic acid component include, but are not limited to, suberic acid, azelaic acid, sebacic acid, 1,10-decanedicarboxylic acid, terephthalic acid, isophthalic acid and 2,6-naphthalenedicarboxylic acid.

The at least one metal selected from the group consisting of transition metals of Group VIII of the Periodic Table, manganese, copper and zinc which is added in the form of a compound or complex thereof either prior to initiation of the polycondensation reaction or during the polycondensation reaction, serves for accelerating the oxidation reaction of reactive polyamide in the resin composition after the polycondensation reaction, thereby enabling the oxygen absorbing polyamide resin composition to exhibit a good oxygen absorbing property.

It is considered that the above oxidation reaction of the polyamide accelerated by the metal is caused by various reactions such as formation of radicals due to removal of hydrogen from methylene chain adjacent to allylene group of the polyamide by the metal, formation of peroxy radicals by the addition of oxygen molecule to the above radicals, and further removal of hydrogen by the peroxy radicals.

In the present invention, the compound or complex containing the above metal to be incorporated in the oxygen absorbing polyamide resin composition (hereinafter occasionally referred to as "metal catalyst compound") is preferably added and mixed in the polycondensation reaction solution either prior to initiation of the polycondensation reaction or during the polycondensation reaction.

The metal catalyst compound contains at least one metal selected from the group consisting of transition metals of Group VIII of the Periodic Table, manganese, copper and zinc. Examples of the transition metals of Group VIII of the Periodic Table include iron, cobalt, nickel or the like.

The metal catalyst compound may be in the form of halides, inorganic acid salts, organic acid salts or complex salts of the metal in a low valence form.

Examples of the halides include chlorides, bromides or the like. Examples of the inorganic acid salts include sulfates, nitrates, phosphates, silicates or the like. Examples of the organic acid salts include carboxylates, sulfonates, phosphonates or the like. Also, the metal catalyst compound may be used in the form of complexes of the transition metal with β-diketone or β-diketo acid ester. In particular, in order to allow the polyamide resin composition of the present invention to exhibit a good oxygen absorbing property when applying the metal catalyst compound thereto, the use of the halides, carboxylates and acetylacetonate complexes containing the metal is preferred, and the use of acetates and acetylacetonate complexes containing the metal is more preferred. In order to produce the oxygen absorbing polyamide resin composition of the present invention, among these metal catalyst compounds, more preferred is at least one compound selected from the group consisting of acetates and acetylacetonate complexes of cobalt.

Upon the production of the oxygen absorbing polyamide resin composition of the present invention, the metal catalyst compound may be added in such an amount that the concentration of the metal in the oxygen absorbing polyamide resin composition is preferably in the range of $1.7\times10^{-4}$ to $1.2\times10^{-2}$ mmol/g and more preferably $8.5\times10^{-4}$ to $1.0\times10^{-2}$ mmol/g.

When the metal concentration is $1.7\times10^{-4}$ mmol/g or higher, the obtained oxygen absorbing polyamide resin composition exhibits a sufficient oxygen absorbing property.

In addition, the metal usually has an effect of reducing the polycondensation reaction rate upon production of the polyamide. Therefore, when the metal concentration is controlled to $1.2\times10^{-2}$ mmol/g or lower under the coexistence of the phosphorus compound, the reduction of the polycondensation reaction rate is prevented, resulting in production of polyamide having a sufficiently large molecular weight. Even though the metal concentration exceeds $1.2\times10^{-2}$ mmol/g, the oxygen absorbing property of the obtained polyamide resin composition is not further improved.

The phosphorus compound added to the reaction system upon production of the polyamide resin composition has effects of inhibiting reduction of the polycondensation reaction rate upon production of the polyamide by acting on the metal, enhancing a processing stability of the polyamide obtained by the polycondensation when the polyamide is melted and molded, and inhibiting coloration of the polyamide.

The wording "in the presence of the phosphorus compound" used herein means that the phosphorus compound is added to the polycondensation reaction system either prior to initiation of the polycondensation reaction or at an initial stage of the polycondensation reaction.

The phosphorus compound used in the present invention preferably contains alkali metals or alkali earth metals. Examples of the phosphorus compound containing alkali metals or alkali earth metals include phosphates, hypophosphites and phosphites of sodium, magnesium, calcium, etc.

Of these phosphorus compounds, especially preferred are hypophosphites of alkali metals or alkali earth metals since the hypophosphites effectively prevents reduction of the polycondensation reaction rate by the metal catalyst compound and undesired coloration of the polyamide obtained by the polycondensation upon molding.

The phosphorus compound may be added to the polycondensation reaction system in such an amount that the phosphorus concentration in the oxygen absorbing polyamide resin composition is preferably in the range of $3.2\times10^{-5}$ to $1.2\times10^{-2}$ mmol/g and more preferably $1.0\times10^{-4}$ to $1.0\times10^{-2}$ mmol/g.

When the phosphorus concentration is $3.2\times10^{-5}$ mmol/g or higher, the oxidation reaction of the polyamide by the metal contained in the metal catalyst compound is effectively prevented during the polycondensation reaction, and the reduction of the polycondensation reaction rate is inhibited, resulting in production of polyamide having a desired molecular weight. Further, the obtained polyamide resin composition is improved in a processing stability and inhibited from undergoing yellow discoloration upon melt-molding.

Even though the phosphorus concentration exceeds $1.2\times10^{-2}$ mmol/g, the effect of inhibiting reduction of the polycondensation reaction rate due to the existence of the metal catalyst compound is not further improved.

Upon production of the oxygen absorbing polyamide resin composition of the present invention, it is required that the phosphorus compound and the metal catalyst compound are added such that a weight ratio (P/M) of the phosphorus concentration P (mmol/g) to the metal concentration M (mmol/g) in the polyamide resin composition is 0.02 to 1.0, preferably 0.025 to 0.95 and more preferably 0.03 to 0.9.

When the ratio P/M is controlled to the range of 0.02 to 1.0 as specified above, the oxygen absorbing polyamide resin composition is produced without reduction of the polycondensation reaction rate, and exhibits an effective and practical oxygen absorbing property.

Upon production of the oxygen absorbing polyamide resin composition of the present invention, the respective reactant monomers are used in such amounts that the value obtained by subtracting an end amino group concentration $[NH_2]$ of the obtained polymer from an end carboxyl group concentration [COOH] thereof is preferably 8 to 82 $\mu$eq/g and more preferably 15 to 75 $\mu$eq/g. When the value obtained by subtracting the end amino group concentration $[NH_2]$ from the end carboxyl group concentration [COOH] is within the above-specified range, the amounts of the diamine monomer and the dicarboxylic acid monomer are kept in a well-balanced condition, resulting in production of polyamide having a desired high molecular weight.

The polyamide contained in the oxygen absorbing polyamide resin composition has an number-average molecular weight of preferably 15,000 to 45,000 and more preferably 16,000 to 42,000. The "number-average molecular weight" used herein represents the value calculated from the end carboxyl group concentration [COOH] and end amino group concentration $[NH_2]$ of the polyamide according to the following formula:

$$\text{Number-average molecular weight}=2/([COOH]+[NH_2])$$

The polyamide resin composition containing the polyamide whose number-average molecular weight is in the range of 15,000 to 45,000 as specified above, is inhibited from undergoing molding difficulty due to too small or too large melt viscosity thereof The number-average molecular weight of the polyamide contained in the oxygen absorbing polyamide resin composition may also be estimated by a relative viscosity of a solution prepared by dissolving 1 g of the polyamide in 100 ml of 96% sulfuric acid as measured at 25° C. Although the relative viscosity of the polyamide varies depending upon its molecular structure, etc., the number-average molecular weight of 15,000 to 45,000 corresponds to the relative viscosity of about 1.8 to 4.2.

Next, the process for producing the oxygen absorbing polyamide resin composition according to the present invention is more specifically explained.

According to the process of the present invention, the oxygen absorbing polyamide resin composition is produced by polycondensing the diamine component with the dicarboxylic acid component in the presence of the phosphorus compound and the metal catalyst compound that is added to the reaction system either prior to initiation of the polycondensation reaction or during the polycondensation reaction.

For example, the oxygen absorbing polyamide resin composition is produced by heating a nylon salt prepared from the diamine component composed mainly of m-xylylenediamine and the dicarboxylic acid component composed mainly of adipic acid under pressure in the presence of water and polymerizing the resultant molten nylon salt while removing water added and condensed water produced by the polymerization. Alternatively, the oxygen absorbing polyamide resin composition is produced by directly adding the diamine component composed mainly of m-xylylenediamine to the molten dicarboxylic acid component composed mainly of adipic acid and polycondensing these components under ordinary pressure while removing condensed water.

In the latter case, in order to keep the reaction system in a uniform liquid state, the diamine component is continuously added to the molten dicarboxylic acid component, and the polycondensation reaction proceeds while heating the reaction system to such a temperature not lower than melting points of the oligoamide and polyamide as produced. In some cases, the reaction system may be held under reduced pressure at a late stage of the polycondensation reaction to effectively remove water produced during the reaction, thereby preventing reduction of the polycondensation reaction rate.

The metal catalyst compound may be added to the reaction system prior to initiation of the polycondensation reaction together with the reactant monomers or during the polycondensation reaction.

When the metal catalyst compound is added during the polycondensation reaction, the addition may be conducted at any timing of the polycondensation reaction as long as the metal atom contained in the metal catalyst compound is uniformly dispersed in the oxygen absorbing polyamide resin composition, though it varies depending upon reaction conditions such as viscosity of the reaction solution and stirring speed.

The metal catalyst compound added either prior to initiation of the polycondensation reaction or during the polycondensation reaction is well dispersed in the polyamide resin composition as compared to the conventional melt-kneading method, resulting in production of an oxygen absorbing polyamide resin composition that is free from unevenness in oxygen absorbing property and has a stable quality.

In the polycondensation reaction for producing the oxygen absorbing polyamide resin composition, the oxygen concentration in a gas phase of the polycondensation reactor is continuously held at preferably 1% by volume or lower, more preferably 0.5% by volume or lower and still more preferably 0.1% by volume or lower.

When the oxygen concentration in the gas phase of the reactor is controlled to 1% by volume or lower, the obtained polyamide resin composition is prevented from undergoing not only discoloration but also oxidation of polyamide by the metal catalyst compound. As a result, the reduction of the polycondensation reaction rate is inhibited, resulting in production of the polyamide having a desired molecular weight.

In the process of the present invention, in order to control the oxygen concentration in the gas phase of the polycondensation reactor to 1% by volume or lower, there may be used a method of flowing an inert gas such as nitrogen and argon through the polycondensation reactor to replace air in the reactor therewith, a method of introducing the inert gas into the reactor, pressurizing an interior of the reactor and then returning it to ordinary pressure, followed by repeating the procedure several times, and a method of holding an interior of the reactor under reduced pressure and then introducing the inert gas thereinto, followed by repeating the procedure several times. Of these methods, preferred are the method of introducing the inert gas into the reactor, pressurizing an interior of the reactor and then returning it to ordinary pressure and the method of holding an interior of the reactor under reduced pressure and then introducing the inert gas thereinto, because the oxygen concentration in the reactor is efficiently reduced by these methods. Also, the inert gas is preferably flowed through the reactor during the reaction to effectively prevent increase of the oxygen concentration in the reactor.

The oxygen absorbing polyamide resin composition obtained by the polycondensation reaction may be immediately used in various applications. However, the number-average molecular weight of the polyamide obtained by the polycondensation reaction may be frequently controlled to about 20,000 or lower to keep the viscosity suitable for removal from the reactor and prevent the polyamide from suffering from heat deterioration.

When applying the polyamide resin composition to packaging materials such as films, sheets and bottles, the polyamide having a number-average molecular weight of about 20,000 may be unsuitable for molding because of insufficient melt viscosity. Therefore, the polyamide obtained by the polycondensation reaction is preferably further subjected to solid phase polymerization to increase its number-average molecular weight.

In the solid phase polymerization according to a preferred embodiment of the present invention, the polyamide obtained by the polycondensation reaction is supplied to a batch-type heating polycondensation reactor, and heated in the form of solids to a temperature not lower than its glass transition point but less than its melting point under reduced pressure to further subject the polyamide to polycondensation reaction while removing condensed water produced. Examples of the batch-type heating polycondensation reactor include, but are not limited to, a Tumbling dryer, a Conical dryer and a Rotary dryer, or a conical heating apparatus equipped with inner rotary blades, i.e., so-called Nauta mixer. In addition, other apparatuses capable of heating the polyamide under reduced pressure may also be usable in the present invention.

In the solid phase polymerization of the oxygen absorbing polyamide resin composition, the oxygen concentration in the reactor is held at preferably 1% by volume or lower, more preferably 0.5% by volume or lower and still more preferably 0.1% by volume or lower. When the oxygen concentration in the reactor exceeds 1% by volume, the resultant polyamide is undesirably discolored and tends to be oxidized by the metal atom, resulting in low reaction rate and failure to obtain a polyamide having a desired molecular weight.

In the above solid phase polymerization, in order to reduce the oxygen concentration in the reactor to 1% by volume or lower, there may be use, for example, a method of flowing an inert gas such as nitrogen and argon through the reactor to replace air in the reactor therewith, a method of introducing the inert gas into the reactor, pressurizing an interior of the reactor and then returning it to ordinary pressure, followed by repeating the procedure several times, and a method of controlling an interior of the reactor to reduced pressure and then introducing the inert gas thereinto, followed by repeating the procedure several times. Of these methods, preferred are the method of introducing the inert gas into the reactor, pressurizing an interior of the reactor and then returning it to ordinary pressure and the method of controlling an interior of the reactor to reduced pressure and then introducing the inert gas thereinto, because the oxygen concentration in the reactor is efficiently reduced by these methods. Also, the inert gas is preferably flowed through the reactor during the reaction to effectively prevent the increase of the oxygen concentration in the reactor.

Upon the solid phase polymerization using the batch-type heating polycondensation reactor, the polyamide resin composition is heated at a temperature not lower than a glass transition point of the polyamide, preferably a temperature higher by 10° C. or more, than the glass transition point, but at a temperature less than a melting point of the polyamide, preferably a temperature lower by 10° C. or more, than the melting point. The polycondensation reaction proceeds smoothly by heating the polyamide in such a temperature range. In order to prevent adhesion of the polyamide onto an inner wall of the reactor and accelerate crystallization thereof, water is preferably added to the reaction system in an amount of 3% by weight or lower and more preferably 2% by weight or lower based on the weight of the polyamide subjected to the solid phase polymerization.

Upon the solid phase polymerization conducted at the above temperature, an interior of the reactor is preferably maintained under reduced pressure. The reduced pressure in the reactor is effective to remove condensed water produced by the polycondensation, thereby preventing reduction of the reaction rate. Prior to removal of the polyamide obtained after the solid phase polymerization from the reactor, the polyamide is preferably cooled to a temperature not higher than the glass transition point thereof.

The oxygen absorbing polyamide resin composition of the present invention may also contain various additives such as pigments, dyes, lubricants, delusterants, heat stabilizers, weather stabilizers, ultraviolet light absorbers, nucleating agents, plasticizers, flame retardants, antistatic agents, anti-gelling agents such as alkali compounds for preventing gelation of the polyamide resin, clay such as phyllosilicates, mica, glass fibers and zeolite, unless the effects of the present invention are adversely affected by adding these additives.

The oxygen absorbing polyamide resin composition of the present invention may be molded into various packaging materials and packaging containers. Examples of the packaging materials include films and sheets. Examples of the packaging containers include bottles, trays, cups, tubes, flat bags and various pouches such as standing pouch. The polyamide resin composition is used as at least a part of these molded products.

The packaging materials and packaging containers may have either a single layer structure made of the oxygen absorbing polyamide resin composition solely or a multilayer structure using the layer made of the oxygen absorbing polyamide resin composition in combination with one or more additional layers made of other thermoplastic resins. Further, the oxygen absorbing polyamide resin composition of the present invention may be used in the form of a mixture with various thermoplastic resins, e.g., polyamides such as typically nylon 6 and nylon 66, polyesters such as typically polyethylene terephthalate and polybutylene terephthalate, polyolefins such as typically polyethylene and polypropylene, polystyrene, polycarbonates and ethylene-vinyl alcohol copolymers in order to improve the properties thereof. The mixture may also be used for production of the packaging materials and packaging containers.

In the packaging materials or packaging containers, the thickness of the layer made of the oxygen absorbing polyamide resin composition of the present invention is not particularly restricted, and is preferably 1 μm or more.

The packaging materials or packaging containers using the oxygen absorbing polyamide resin composition of the present invention may be produced by any known methods. For example, the packaging materials in the form of films, sheets and tubes may be produced by extruding a molten polyamide resin composition obtained by passing through T-die or circular die, from an extruder disposed adjacent thereto. The thus molded films may be stretched to obtain stretched films. The bottle-shaped packaging containers may be produced by injecting the molten polyamide resin composition from an injection-molding machine to a mold to obtain a preform, heating the preform to a stretching temperature and then blow-stretching the preform. The containers in the form of trays and cups may be produced by injecting the molten polyamide resin composition from an injection-molding machine to a mold, or by subjecting the sheet-shaped packaging material to vacuum forming or pressure forming. The production of the packaging materials or packaging containers using the oxygen absorbing polyamide resin composition of the present invention is not limited to the above methods, and various other methods may be used to produce these packaging materials or packaging containers.

The packaging containers using the oxygen absorbing polyamide resin composition of the present invention may be used to enclose or preserve various products therein. Examples of the products enclosed or preserved in the packaging containers include liquid beverages such as carbonated beverage, juice, water, milk, sake, whisky, shochu, coffee, tea, jelly beverage and healthy beverage, seasonings such as liquid seasoning, sauce, soy sauce, dressing, liquid soup stock, mayonnaise, miso and grated spices, pasty foodstuffs such as jam, cream and chocolate paste, liquid foodstuffs, typically, liquid processed foodstuffs such as liquid soup, cooked food, pickles and stew, raw or boiled noodles such as buckwheat noodle, wheat noodle and Chinese noodle, uncooked or boiled rice such as polished rice, water-conditioned rice and washing-free rice, processed rice products such as boiled rice mixed with fish and vegetables, rice boiled together with red beans and rice gruel, high water content foodstuffs, typically powdery seasonings such as powdery soup and powdery soup stock, and low water content foodstuffs such as typically dehydrated vegetables, coffee beans, roasted tea, confectioneries made of cereals, as well as solid and solution chemicals such as agricultural chemicals and insecticides, liquid or pasty drugs, beauty wash, cosmetic cream, milky lotion, hair dressing, hair dye, shampoo, soap and detergent .

The present invention will be described in more detail below with reference to the following examples and comparative examples. However, these examples are only illustrative and not intended to limit the present invention thereto.

In the following Examples and Comparative Examples, various characteristics and properties were measured and evaluated by the following methods.

(1) End Amino Group Concentration

Polyamide in an amount of 0.3 to 0.5 g was accurately weighed, and dissolved in 30 ml of a mixed solvent containing phenol and ethanol at a volume ratio of 4:1 while stirring. After the complete dissolution, the resulting polyamide solution was subjected to neutralization titration with a 1/100 N hydrochloric acid to determine an end amino group concentration thereof.

(2) End Carboxyl Group Concentration

Polyamide in an amount of 0.3 to 0.5 g was accurately weighed, and dissolved in 30 ml of benzyl alcohol while stirring at a temperature of 160 to 180° C. under a nitrogen flow. After the complete dissolution, the resulting polyamide solution was cooled to 80° C. under a nitrogen flow. Then, 10 ml of methanol was added to the solution while stirring, and the resulting solution was subjected to neutralization titration with a 1/100 N sodium hydroxide to determine an end carboxyl group concentration thereof.

(3) Number-Average Molecular Weight

The number-average molecular weight of the polyamide was calculated from the thus measured end amino group concentration and end carboxyl group concentration according to the following formula:

$$\text{Number-Average Molecular Weight}=2/([COOH]+[NH_2])$$

(4) Oxygen Concentration in Reaction System

The gas in the reaction system was sampled using a syringe, and measured by a zirconia-type oxygen concentration meter available from Toray Co., Ltd.

(5) Oxygen Permeability

The oxygen permeability was measured at 23° C. and a relative humidity of 60% according to ASTM D3985 using "OX-TRAN 10/50A" available from Modern Controls Corp.

(6) Tensile Strength

The tensile strength was measured according to ASTM D3985 using STROGRAPH T1-C available from Toyo Seiki Co., Ltd.

(7) Quantitative Determination of Cobalt

Two grams of pellets of polyamide resin composition were accurately weighed, preliminarily burned, and then ashed in an electric furnace at 800° C. for 3 hours. After cooling, nitric acid was intermittently added to the resulting ashes six times such that a total amount of the nitric acid added was 2 ml. The ashes were completely evaporated to dryness on a hot plate at a temperature of 300 to 350° C. Then, 3 ml of hydrochloric acid was added to the obtained solid, and the mixture was heated to 200 to 250° C. and dried and solidified until only a very small amount of hydrochloric acid remained at the bottom of a crucible. Further, distilled water was added to the obtained solid to obtain a liquid having a total volume of 25 ml. The resultant liquid was held at 20° C. in a cooler to prepare a test specimen.

The thus prepared test specimen was subjected to atomic absorption analysis using an analyzer "AA-6500" available from Shimadzu Seisakusho Co., Ltd. to determine a quantity of cobalt contained in the test specimen.

EXAMPLE 1

A 2 liter jacketed reactor (withstanding pressure: 1 MPa) equipped with a partial condenser, a total condenser, a dropping funnel, a nitrogen feed pipe, a stirrer with agitating blades and a torque meter, and a strand die, was charged with 585.4 g (4.006 mol) of adipic acid and further with 0.3377 g of sodium hypophosphite monohydrate and 0.8345 g of cobalt acetate tetrahydrate such that phosphorus and cobalt concentrations in a finally obtained polyamide resin composition were $3.2\times10^{-3}$ mmol/g and $3.4\times10^{-3}$ mmol/g, respectively. Thereafter, the reactor was purged with a nitrogen gas having a purity of 99% by volume or higher until an oxygen concentration in a gas phase in the reactor reduced to less than 0.1% by volume. The ratio of the phosphorus concentration to the cobalt concentration (P/Co) in the polyamide resin composition was 0.94.

The contents of the reactor were continuously heated to 170° C. for about 30 minutes while stirring at ordinary pressure under a nitrogen flow to obtain a slurry. To the slurry was continuously dropped 545.6 g (4.006 mol) of m-xylylenediamine for 90 minutes. The resulting reaction solution was continuously heated to 240° C. while removing condensed water produced by the polycondensation reaction and taking care so as not to solidify the reaction solution.

After completion of dropping the m-xylylenediamine, the reaction solution was further heated to 260° C. for 10 minutes. The polycondensation reaction of the reaction solution proceeded while maintaining its temperature at 260° C. and monitoring the torque value of the stirrer, and the stirring operation was terminated at the time at which the desired torque value was reached.

The reaction time required from the completion of dropping the m-xylylenediamine to the termination of the stirring operation was 32 minutes. Then, the obtained reaction product was extruded from the strand die, passed through a cooling vessel, and pelletized by a pelletizer to obtain pellets of a polyamide resin composition E1. It was confirmed that the thus obtained polyamide resin composition E1 had an end amino group concentration of 41.6 μeq/g, an end carboxyl group concentration of 83.0 μeq/g and a number-average molecular weight of 16,100.

Next, the polyamide resin composition E1 was formed into a single-layer film having a thickness of about 60 μm using a film forming apparatus equipped with an extruder, a T-die, a cooling roll, a take-up device, etc. The obtained single-layer film was cut into two single-layer 10 cm-square sheets. The single-layer square sheets were enclosed together with a cotton impregnated with 10 ml of water in a three side-closed bag having a size of 10 cm×15 cm which was prepared from a three-layer laminated film composed of a PET film, an aluminum foil and a polyethylene film arranged in this order from outside to inside. The bag was heat-sealed along an open side thereof to obtain a closed bag containing 200 ml of air therein. The bag was preserved in a dryer at 40° C. for 30 days, and the oxygen concentration in the bag was measured. The results are shown in Table 1

EXAMPLE 2

The same procedure as in Example 1 was repeated except for adding 0.0169 g of sodium hypophosphite monohydrate and 0.8345 g of cobalt acetate tetrahydrate such that the phosphorus and cobalt concentrations in the polyamide resin composition were $1.6\times10^{-4}$ mmol/g and $3.4\times10^{-3}$ mmol/g, respectively, to obtain a polyamide resin composition E2.

The ratio to the phosphorus concentration to the cobalt concentration in the polyamide resin composition E2 was 0.05. It was confirmed that the obtained polyamide resin composition E2 had an end amino group concentration of 43.2 μeq/g, an end carboxyl group concentration of 82.5 μeq/g and a number-average molecular weight of 15,900.

The reaction time required from the completion of dropping the m-xylylenediamine to the termination of the stirring operation was 36 minutes.

Then, the oxygen absorbing property of the obtained polyamide resin composition E2 was measured by the same method as in Example 1. The results are shown in Table 1.

EXAMPLE 3

The same procedure as in Example 1 was repeated except for adding 0.5065 g of sodium hypophosphite monohydrate and 1.2518 g of cobalt acetate tetrahydrate such that the phosphorus and cobalt concentrations in the polyamide resin composition were $4.8\times10^{-3}$ mmol/g and $5.1\times10^{-3}$ mmol/g, respectively, to obtain a polyamide resin composition E3.

The ratio to the phosphorus concentration to the cobalt concentration in the polyamide resin composition E3 was 0.94. It was confirmed that the obtained polyamide resin composition E3 had an end amino group concentration of 44.6 μeq/g, an end carboxyl group concentration of 81.0 μeq/g and a number-average molecular weight of 15,900.

The reaction time required from the completion of dropping the m-xylylenediamine to the termination of the stirring operation was 28 minutes.

Then, the oxygen absorbing property of the obtained polyamide resin composition E3 was measured by the same method as in Example 1. The results are shown in Table 1.

EXAMPLE 4

The same procedure as in Example 1 was repeated except for adding 0.8442 g of sodium hypophosphite monohydrate and 2.9841 g of cobalt acetylacetonate instead of cobalt acetate tetrahydrate such that the phosphorus and cobalt concentrations in the polyamide resin composition were $8.1\times10^{-3}$ mmol/g and $8.5\times10^{-3}$ mmol/g, respectively, to obtain a polyamide resin composition E4.

The ratio to the phosphorus concentration to the cobalt concentration in the polyamide resin composition E4 was 0.95. It was confirmed that the obtained polyamide resin composition E4 had an end amino group concentration of 46.0 μeq/g, an end carboxyl group concentration of 77.8 μeq/g and a number-average molecular weight of 16,200.

The reaction time required from the completion of dropping the m-xylylenediamine to the termination of the stirring operation was 28 minutes.

Then, the oxygen absorbing property of the obtained polyamide resin composition E4 was measured by the same method as in Example 1. The results are shown in Table 1.

EXAMPLE 5

The same procedure as in Example 1 was repeated except for adding 1.3545 g of calcium hypophosphite instead of sodium hypophosphite monohydrate such that the phosphorus concentration in the polyamide resin composition was $3.2\times10^{-3}$ mmol/g, to obtain a polyamide resin composition E5.

The ratio to the phosphorus concentration to the cobalt concentration in the polyamide resin composition E5 was 0.94. It was confirmed that the obtained polyamide resin composition E5 had an end amino group concentration of 43.9 μeq/g, an end carboxyl group concentration of 80.1 μeq/g and a number-average molecular weight of 16,100. The reaction time required from the completion of dropping the m-xylylenediamine to the termination of the stirring operation was 33 minutes.

Then, the oxygen absorbing property of the obtained polyamide resin composition E5 was measured by the same method as in Example 1. The results are shown in Table 1.

EXAMPLE 6

A 2 liter jacketed reactor (withstanding pressure: 25 MPa) equipped with a cooling pipe, a nitrogen feed pipe, a stirrer with agitating blades and a torque meter, and a strand die, was charged with 322.0 g (2.272 mol) of adipic acid, 300.2 g (2.272 mol) of m-xylylenediamine and 218.0 g of distilled water and further with 0.1857 g of sodium hypophosphite monohydrate and 0.6885 g of cobalt acetate tetrahydrate such that phosphorus and cobalt concentrations in a finally obtained polyamide resin composition were $3.2\times10^{-3}$ mmol/g and $5.1\times10^{-3}$ mmol/g, respectively.

The ratio of the phosphorus concentration to the cobalt concentration (P/Co) in the polyamide resin composition was 0.63.

Thereafter, an interior of the reactor was purged with a nitrogen gas having a purity of 99% by volume or higher until an oxygen concentration in a gas phase in the reactor was reduced to less than 0.1% by volume. Then, the reactor was closed and heated to 172° C. At the time at which an inside pressure of the reactor reached 0.6 MPa, the reaction solution was continuously heated from 172° C. to 217° C. under stirring for 120 minutes while maintaining the inside pressure at 0.6 MPa and removing water distilled from the reactor.

Successively, a nitrogen gas was introduced into the reactor to reduce the inside pressure to ordinary pressure for 30 minutes, and then an inside temperature of the reactor was continuously raised from 217° C. to 243° C. for 10 minutes. Then, the reaction solution was heated to 260° C. for 10 minutes at ordinary pressure under a nitrogen flow. The polycondensation reaction of the reaction solution proceeded while maintaining its temperature at 260° C. and monitoring the torque value of the stirrer, and the stirring operation was terminated at the time at which the desired torque value was reached. The time required from the moment at which the inside pressure of the reactor reached ordinary pressure to the termination of the stirring operation was 38 minutes.

Then, the obtained reaction product was extruded from the strand die, passed through a cooling vessel, and pelletized by a pelletizer to obtain pellets of a polyamide resin composition E6. It was confirmed that the thus obtained polyamide resin composition E6 had an end amino group concentration of 53.5 μeq/g, an end carboxyl group concentration of 76.4 μeq/g and a number-average molecular weight of 15,400.

Two single-layer square sheets were prepared and the oxygen absorbing property of the polyamide resin composition E6 was measured by the same method as in Example 1. The results are shown in Table 1

COMPARATIVE EXAMPLE 1

The same procedure as in Example 1 was repeated except for adding no cobalt acetate tetrahydrate, to obtain a polyamide resin composition C1. It was confirmed that the obtained polyamide resin composition C1 had an end amino group concentration of 44.0 μeq/g, an end carboxyl group concentration of 81.1 μeq/g and a number-average molecular weight of 16,000. The reaction time required from the completion of dropping the m-xylylenediamine to the termination of the stirring operation was 31 minutes.

Then, the oxygen absorbing property of the obtained polyamide resin composition C1 was measured by the same method as in Example 1. The results are shown in Table 1.

COMPARATIVE EXAMPLE 2

The same procedure as in Example 2 was repeated except for adding no cobalt acetate tetrahydrate, to obtain a polyamide resin composition C2. It was confirmed that the obtained polyamide resin composition C2 had an end amino group concentration of 46.2 μeq/g, an end carboxyl group concentration of 78.8 μeq/g and a number-average molecular weight of 16,000. The reaction time required from the completion of dropping the m-xylylenediamine to the termination of the stirring operation was 34 minutes.

Then, the oxygen absorbing property of the obtained polyamide resin composition C2 was measured by the same method as in Example 1. The results are shown in Table 1.

COMPARATIVE EXAMPLE 3

The same procedure as in Example 3 was repeated except for adding no cobalt acetate tetrahydrate, to obtain a polyamide resin composition C3. It was confirmed that the obtained polyamide resin composition C3 had an end amino group concentration of 45.4 μeq/g, an end carboxyl group concentration of 80.7 μeq/g and a number-average molecular weight of 15,900. The reaction time required from the completion of dropping the m-xylylenediamine to the termination of the stirring operation was 28 minutes.

Then, the oxygen absorbing property of the obtained polyamide resin composition C3 was measured by the same method as in Example 1. The results are shown in Table 1.

COMPARATIVE EXAMPLE 4

The same procedure as in Example 3 was repeated except for adding no sodium hypophosphite monohydrate, to obtain a polyamide resin composition C4. It was confirmed that the obtained polyamide resin composition C4 had an end amino group concentration of 48.8 μeq/g, an end carboxyl group concentration of 77.2 μeq/g and a number-average molecular weight of 15,900. The reaction time required from the completion of dropping the m-xylylenediamine to the termination of the stirring operation was prolonged up to 53 minutes.

Then, the oxygen absorbing property of the obtained polyamide resin composition C4 was measured by the same method as in Example 1. The results are shown in Table 1.

COMPARATIVE EXAMPLE 5

The same procedure as in Example 3 was repeated except for adding 0.8345 g of cobalt acetate tetrahydrate such that the cobalt concentration in the polyamide resin composition was $3.4\times10^{-3}$ mmol/g, to obtain a polyamide resin composition C5. The ratio of the phosphorus concentration to the cobalt concentration in the polyamide resin composition was 1.41. It was confirmed that the obtained polyamide resin composition C5 had an end amino group concentration of 43.0 μeq/g, an end carboxyl group concentration of 82.3 μeq/g and a number-average molecular weight of 16,000. The reaction time required from the completion of dropping the m-xylylenediamine to the termination of the stirring operation was 28 minutes.

Then, the oxygen absorbing property of the obtained polyamide resin composition C5 was measured by the same method as in Example 1. The results are shown in Table 1.

COMPARATIVE EXAMPLE 6

The same procedure as in Example 6 was repeated except for adding no cobalt acetate tetrahydrate, to obtain a polyamide resin composition C6. It was confirmed that the obtained polyamide resin composition C6 had an end amino group concentration of 54.4 μeq/g, an end carboxyl group concentration of 76.2 μeq/g and a number-average molecular weight of 15,300. The time required from the moment at which the inside pressure of the reactor reached ordinary pressure to the termination of the stirring operation was 37 minutes.

Then, the oxygen absorbing property of the obtained polyamide resin composition C6 was measured by the same method as in Example 1. The results are shown in Table 1.

As is apparent from Table 1, in Examples 1 to 6 in which the ratio of the phosphorus concentration to the cobalt concentration (P/M) in the respective polyamide resin compositions was in the range of 0.02 to 1.0, the polycondensation reaction underwent substantially no reduction in reaction rate irrespective of polycondensation conditions as compared to Comparative Examples 1 to 3 and 6 in which no cobalt compound was added, and the obtained polyamide exhibited the substantially same number-average molecular weight as that of polyamide produced by an ordinary method when using the substantially same reaction time in each process, as well as a good oxygen absorbing property.

In Comparative Example 4 in which the polycondensation reaction was conducted without addition of phosphorus, no effect of accelerating the rate of reaction for production of polyamide by the existence of phosphorus was attained, resulting in considerable reduction in the reaction rate. In Comparative Example 5 in which the ratio of the phosphorus concentration to the cobalt concentration (P/M) in the polyamide resin composition exceeded 1.0, although no reduction in reaction rate was observed, the obtained polyamide resin composition was considerably deteriorated in oxygen absorbing property.

TABLE 1-1

| | Examples | | | | | |
|---|---|---|---|---|---|---|
| | 1 | 2 | 3 | 4 | 5 | 6 |
| P (mmol/g) | $3.2 \times 10^{-3}$ | $1.6 \times 10^{-4}$ | $4.8 \times 10^{-3}$ | $8.1 \times 10^{-3}$ | $3.2 \times 10^{-3}$ | $3.2 \times 10^{-3}$ |
| Co (mmol/g) | $3.4 \times 10^{-3}$ | $3.4 \times 10^{-3}$ | $5.1 \times 10^{-3}$ | $8.5 \times 10^{-3}$ | $3.4 \times 10^{-3}$ | $5.1 \times 10^{-3}$ |
| P/Co | 0.94 | 0.05 | 0.94 | 0.95 | 0.94 | 0.63 |
| Reaction time[a)] (min) | 32 | 36 | 28 | 28 | 33 | 38 |
| $[NH_2]$ (μeq/g) | 41.6 | 43.2 | 44.6 | 46.0 | 43.9 | 53.5 |
| [COOH] (μeq/g) | 83.0 | 82.5 | 81.0 | 77.8 | 80.1 | 76.4 |
| Number-average molecular weight | 16,100 | 15,900 | 15,900 | 16,200 | 16,100 | 15,400 |
| Oxygen concentration in bag after 30 day preservation test (%) | 12.0 | 10.7 | 13.9 | 12.3 | 13.9 | 12.6 |

TABLE 1-2

| | Comparative Examples | | | | | |
|---|---|---|---|---|---|---|
| | 1 | 2 | 3 | 4 | 5 | 6 |
| P (mmol/g) | $3.2 \times 10^{-3}$ | $1.6 \times 10^{-4}$ | $4.8 \times 10^{-3}$ | 0 | $4.8 \times 10^{-3}$ | $3.2 \times 10^{-3}$ |
| Co (mmol/g) | 0 | 0 | 0 | $5.1 \times 10^{-3}$ | $3.4 \times 10^{-3}$ | 0 |

TABLE 1-2-continued

| | Comparative Examples | | | | | |
|---|---|---|---|---|---|---|
| | 1 | 2 | 3 | 4 | 5 | 6 |
| P/Co | — | — | — | 0 | 1.41 | — |
| Reaction time[a)] (min) | 31 | 34 | 28 | 53 | 28 | 37 |
| $[NH_2]$ ($\mu$eq/g) | 44.0 | 46.2 | 45.4 | 48.8 | 43.0 | 54.4 |
| [COOH] ($\mu$eq/g) | 81.1 | 78.8 | 80.7 | 77.2 | 82.3 | 76.2 |
| Number-average molecular weight | 16,000 | 16,000 | 15,900 | 15,900 | 16,000 | 15,300 |
| Oxygen concentration in bag after 30 day preservation test (%) | 20.5 | 20.5 | 20.5 | 10.0 | 17.5 | 20.5 |

Note

[a)]Ex 1–5 and Com. Ex. 1–5: time required from completion of dropping m-xylylenediamine to termination of stirring; Ex 6 and Com. Ex. 6: time required from the moment at which an inside pressure of the reactor reached ordinary pressure to termination of stirring.

EXAMPLE 7

A 2 liter egg-shaped flask filled with 500 g of pellets of the polyamide resin composition E1 obtained Example 1 was fitted to an evaporator equipped with a nitrogen gas feed pipe, a vacuum line, a vacuum pump and a thermocouple for measuring its inside temperature, and immersed in an oil bath, and the evaporator was rotated at 40 rpm using a drive unit thereof.

Then, an interior of the egg-shaped flask was purged with a nitrogen gas having a purity of 99% by volume or higher until an oxygen concentration in a gas phase in the evaporator was reduced to less than 0.1% by volume. The oil was heated under the nitrogen gas flow to increase the temperature of the pellets to 150° C. for about 60 minutes. At the time at which the temperature of the pellets reached 150° C., a pressure of the reaction system was reduced to 1 torr or lower. While continuously heating the oil, the temperature of the pellets was increased to 200° C. for about 70 minutes, and maintained at that temperature for 40 minutes.

Then, after a nitrogen gas having a purity of 99% by volume or higher was introduced into the reaction system, the egg-shaped flask was removed from the oil bath, and the polyamide resin composition E1 was subjected to solid phase polymerization while continuously rotating the evaporator for air-cooling, to obtain a polyamide resin composition E7. It was confirmed that the obtained polyamide resin composition E7 had an end amino group concentration of 19.0 $\mu$eq/g, an end carboxyl group concentration of 60.6 $\mu$eq/g and a number-average molecular weight of 25,100.

Then, the oxygen absorbing property of the obtained polyamide resin composition E7 was measured by the same method as in Example 1. The results are shown in Table 2.

EXAMPLES 8 TO 12

The polyamide resin compositions E1 to E6 were subjected to solid phase polymerization by the same method as in Example 7 to obtain polyamide resin compositions E8 to E12.

The results of measurement for the end amino group concentration, end carboxyl group concentration, number-average molecular weight and oxygen absorbing property of the obtained polyamide resin compositions E8 to E12 are shown in Table 2.

COMPARATIVE EXAMPLES 7 TO 12

The polyamide resin compositions C1 to C6 were subjected to solid phase polymerization by the same method as in Example 7 to obtain polyamide resin compositions C7 to C12.

The results of measurement for the end amino group concentration, end carboxyl group concentration, number-average molecular weight and oxygen absorbing property of the obtained polyamide resin compositions C7 to C12 are shown in Table 2.

As is apparent from Table 2, in Examples 7 to 12 in which the ratio of the phosphorus concentration to the cobalt concentration (P/M) in the respective polyamide resin compositions was in the range of 0.02 to 1.0, the polycondensation reaction underwent substantially no reduction in reaction rate as compared to Comparative Examples 7 to 9 and 12 in which no cobalt compound was added, and the polyamide obtained by the solid phase polymerization exhibited the substantially same number-average molecular weight as that of polyamide produced by an ordinary method when using the substantially same reaction time in each process, as well as a good oxygen absorbing property.

In Comparative Example 10 in which the solid phase polymerization was conducted without addition of phosphorus, no effect of accelerating the reaction by the existence of phosphorus was attained, resulting in considerable reduction in the reaction rate. As a result, under the same reaction conditions as used in Example 7, the polycondensation reaction failed to proceed until the molecular weight of the polyamide reached a desired value. In Comparative Example 11 in which the polyamide having a ratio of phosphorus concentration to cobalt concentration (P/M) of more than 1.0 was subjected to solid phase polymerization, although no reduction in reaction rate was observed, the obtained polyamide resin composition was considerably deteriorated in oxygen absorbing property.

TABLE 2-1

| | Examples | | | | | |
|---|---|---|---|---|---|---|
| | 7 | 8 | 9 | 10 | 11 | 12 |
| P (mmol/g) | $3.2 \times 10^{-3}$ | $1.6 \times 10^{-4}$ | $4.8 \times 10^{-3}$ | $8.1 \times 10^{-3}$ | $3.2 \times 10^{-3}$ | $3.2 \times 10^{-3}$ |
| Co (mmol/g) | $3.4 \times 10^{-3}$ | $3.4 \times 10^{-3}$ | $5.1 \times 10^{-3}$ | $8.5 \times 10^{-3}$ | $3.4 \times 10^{-3}$ | $5.1 \times 10^{-3}$ |
| P/Co | 0.94 | 0.05 | 0.94 | 0.95 | 0.94 | 0.63 |
| $[NH_2]$ (μeq/g) | 19.0 | 21.8 | 19.8 | 22.8 | 21.5 | 26.3 |
| [COOH] (μeq/g) | 60.6 | 62.0 | 57.4 | 56.4 | 57.1 | 55.1 |
| Number-average molecular weight | 25,100 | 23,900 | 25,900 | 25,300 | 25,500 | 24,600 |
| Oxygen concentration in bag after 30 day preservation test (%) | 12.6 | 11.0 | 14.5 | 13.0 | 14.2 | 13.3 |

TABLE 2-2

| | Comparative Examples | | | | | |
|---|---|---|---|---|---|---|
| | 7 | 8 | 9 | 10 | 11 | 12 |
| P (mmol/g) | $3.2 \times 10^{-3}$ | $1.6 \times 10^{-4}$ | $4.8 \times 10^{-3}$ | 0 | $4.8 \times 10^{-3}$ | $3.2 \times 10^{-3}$ |
| Co (mmol/g) | 0 | 0 | 0 | $5.1 \times 10^{-3}$ | $3.4 \times 10^{-3}$ | 0 |
| P/Co | — | — | — | 0 | 1.41 | — |
| $[NH_2]$ (μeq/g) | 20.8 | 23.9 | 20.8 | 35.9 | 20.7 | 28.0 |
| [COOH] (μeq/g) | 58.8 | 58.0 | 56.6 | 63.5 | 58.5 | 52.9 |
| Number-average molecular weight | 25,100 | 24,400 | 25,800 | 20,100 | 25,200 | 24,700 |
| Oxygen concentration in bag after 30 day preservation test (%) | 20.5 | 20.5 | 20.5 | 10.7 | 17.8 | 20.5 |

EXAMPLE 13

A 50 liter jacketed stainless steel reactor equipped with temperature-controllable partial condenser, total condenser, stirrer, nitrogen feed pipe, vacuum pump and pressure-reducing valve as well as flow-controllable liquid dropping device was charged with 15 kg (102.6 mol) of adipic acid and further with 8.57 g of sodium hypophosphite monohydrate and 21.41 g of cobalt acetate tetrahydrate such that phosphorus and cobalt concentrations in a finally obtained polyamide resin composition were $3.2\times10^{-3}$ mmol/g and $3.4\times10^{-3}$ mmol/g, respectively. Thereafter, an interior of the reactor was purged with a nitrogen gas having a purity of 99% by volume or higher until an oxygen concentration in a gas phase in the reactor was reduced to less than 0.1% by volume. The ratio of the phosphorus concentration to the cobalt concentration (P/Co) in the polyamide resin composition was 0.94.

The contents of the reactor were heated to 170° C. for about one hour while stirring under a nitrogen flow to obtain a slurry. To the slurry was continuously dropped 13.9 kg (102.1 mol) of m-xylylenediamine for about 3 hours while stepwise reducing the dropping velocity. The resulting reaction solution was continuously heated to 240° C. while removing condensed water produced by the polycondensation reaction and taking care so as not to solidify the contents of the reactor.

After completion of dropping the m-xylylenediamine, the reaction solution was further heated to 260° C. for 20 minutes. The inside pressure of the reactor was reduced to 500 torr for 15 minutes using the vacuum pump while maintaining its temperature at 260° C., and the reaction continued while maintaining the reaction system under the reduced pressure. The stirrer was stopped at the time at which a desired rotating torque value of the stirrer was reached, and a nitrogen gas was introduced into the reactor to increase the inside pressure of the reactor. Then, the obtained polymer was extruded from the strand die disposed underneath the reactor, passed through a cooling vessel, and pelletized by a pelletizer to obtain pellets of a polyamide resin composition E13.

It was confirmed that the thus obtained polyamide resin composition E13 had an end amino group concentration of 41.4 μeq/g, an end carboxyl group concentration of 83.0 μeq/g and a number-average molecular weight of 16,100.

Next, the obtained polyamide resin composition E13 was subjected to solid phase polymerization using a jacketed rotary drum-type batch polymerizer equipped with a nitrogen gas feed pipe, a vacuum pump, a pressure-reducing valve and a thermocouple for measuring its inside temperature.

More specifically, the drum was charged with 20 kg of pellets of the polyamide resin composition E13, and rotated at 20 rpm. Then, an interior of the drum was purged with a nitrogen gas having a purity of 99% by volume or higher until an oxygen concentration in the drum was reduced to less than 0.1% by volume. The contents of the drum were heated under the nitrogen gas flow to raise the temperature of the pellets to 150° C. for about 2 hours. At the time at which the temperature of the pellets reached 150° C., an inside pressure of the drum was reduced to 1 torr or lower. While continuously heating, the temperature of the pellets was further increased to 200° C. for about 90 minutes, and maintained at that temperature for 40 minutes. Then, a nitrogen gas having a purity of 99% by volume or higher was introduced into the drum to return an inside pressure thereof to ordinary pressure, and thereafter the contents in the drum was cooled under the nitrogen gas flow. At the time at which the pellets were cooled to about 70° C., a ball valve disposed underneath the drum was opened to remove the pellets therefrom, thereby obtaining a polyamide resin composition ES13.

Three samples of the thus obtained polyamide resin composition ES13 were randomly taken out in an amount of 20 g for each, and the end amino group concentration, end carboxyl group concentration and cobalt concentration of these samples were measured. The results are shown in Table 3.

COMPARATIVE EXAMPLE 13

A polyamide resin composition C13 was produced by the same method as in Example 13 except for adding no cobalt acetate tetrahydrate. It was confirmed that the obtained polyamide resin composition C13 had an end amino group concentration of 41.4 μeq/g, an end carboxyl group concentration of 83.0 μeq/g and a number-average molecular weight of 16,100.

Next, the polyamide resin composition C13 was subjected to solid phase polymerization by the same method as in Example 13 to obtain a polyamide resin composition CS13. It was confirmed that the obtained polyamide resin composition CS13 had an end amino group concentration of 18.8 μeq/g, an end carboxyl group concentration of 60.3 μeq/g and a number-average molecular weight of 25,300.

Then, 25 kg of the polyamide resin composition CS13 was dry-blended with 0.8345 g of cobalt acetate tetrahydrate using a unidirectional rotation-type twin-screw extruder having a screw diameter of 30 mmϕ and a L/D ratio of 40 such that the cobalt concentration in a finally obtained polyamide resin composition was $3.4\times10^{-3}$ mmol/g. The resulting mixture was charged into a metering feeder fitted to the extruder, and extruded at an extruder temperature of 270° C. and a feed velocity of 10 kg/hr through a strand die fitted at a tip end of the extruder to obtain strands. The obtained strands were air-cooled on a net belt and then pelletized by a pelletizer, thereby obtaining pellets of a polyamide resin composition CS13-Co. The residence time of the resin in the extruder was about 2 minutes. At the times at which an extruder output of the resin reached 2 kg, 13 kg and 24 kg, respectively, the extruded resin was sampled in an amount of 20 g for each, and the end amino group concentration, end carboxyl group concentration and cobalt concentration of these samples were measured. The results are shown in Table 3.

COMPARATIVE EXAMPLE 14

A polyamide resin composition C14 was produced by the same method as in Comparative Example 13 except that the extrusion was performed using an extruder temperature of 280° C., a feed velocity of 8 kg/hr and a residence time in extruder of about 1.5 minutes. Further, the polyamide resin composition CS14 was subjected to solid phase polymerization by the same method as in Comparative Example 13 to obtain a polyamide resin composition CS14. Then, the obtained polyamide resin composition CS14 was melt-kneaded with cobalt acetate tetrahydrate by an extruder, and extruded therefrom to obtain a polyamide resin composition CS14-Co.

The end amino group concentration, end carboxyl group concentration and cobalt concentration of the polyamide resin composition CS14-Co were measured by the same method as in Example 14. The results are shown in Table 3.

TABLE 3

| | $[NH_2]$ (μeq/g) | [COOH] (μeq/g) | Number-average molecular weight | Cobalt concentration (mmol/g) |
|---|---|---|---|---|
| Polyamide resin composition ES13 | | | | |
| Sample 1 | 18.8 | 60.4 | 25,300 | $3.4 \times 10^{-3}$ |
| Sample 2 | 18.9 | 60.4 | 25,300 | $3.4 \times 10^{-3}$ |
| Sample 3 | 18.8 | 60.4 | 25,200 | $3.4 \times 10^{-3}$ |
| Polyamide resin composition CS13-Co | | | | |
| at 2 kg output | 24.1 | 66.0 | 22,200 | $3.3 \times 10^{-3}$ |
| at 13 kg output | 24.5 | 66.4 | 22,000 | $3.6 \times 10^{-3}$ |
| at 24 kg output | 22.5 | 63.9 | 23,100 | $2.9 \times 10^{-3}$ |
| Polyamide resin composition CS14-Co | | | | |
| at 2 kg output | 25.6 | 67.5 | 21,500 | $3.4 \times 10^{-3}$ |
| at 13 kg output | 25.8 | 67.7 | 21,400 | $3.7 \times 10^{-3}$ |
| at 24 kg output | 25.1 | 66.8 | 21,800 | $2.8 \times 10^{-3}$ |

From the results of Example 13 and Comparative Examples 13 and 14, it was confirmed that the polyamide resin compositions produced by the process of the present invention exhibited substantially uniform end group concentrations, number-average molecular weight and cobalt concentration. In the Comparative Examples in which cobalt was melt-kneaded in the polyamide using an extruder, the obtained polyamide was apparently deteriorated in molecular weight as compared to that of the starting polymer, and it was also apparently confirmed that the molecular weight of the obtained polymer varied with change in melt-kneading conditions. For example, in order to increase the molecular weight of the obtained polyamide to that of the starting polymer, the polyamide must be subjected to an additional solid phase polymerization step, resulting in increased production costs. Further, in the Comparative Examples, the samples had an uneven cobalt concentration which is considered to be due to separation between the pellets and cobalt acetate tetrahydrate in the metering feeder. If the samples are used to form various molded products, it is expected that an oxygen absorbing property thereof becomes uneven.

EXAMPLE 14

Using a multi-layer film production apparatus equipped with three extruders, a T-die, a cooling roll, a take-up device, etc., the polyamide resin composition E13 obtained in Example 13 and nylon 6 were extruded from the respective extruders to obtain a multi-layer film having a three layer structure made of two different kinds of materials, i.e., constituted of a nylon 6 layer (40 μm), a polyamide resin composition E13 layer (40 μm) and a nylon 6 layer (40 μm).

The thus obtained film was subjected to simultaneous biaxial stretching at a temperature of 120° C., a stretching velocity of 180%/sec and a stretch ratio of 3×3 times followed by heat inertia for 30 seconds. The resulting film was immediately heat-treated at 240° C. for 5 seconds to obtain a biaxially stretched film having a three layer structure constituted of a nylon 6 layer (5 μm), a polyamide resin composition E13 layer (5 μm) and a nylon 6 layer (5 μm).

The measurement showed that the obtained biaxially stretched film had an oxygen permeability of 3.5 $ml/m^2\cdot atm\cdot day$, i.e., an excellent gas-barrier property, and tensile strengths of 225 MPa in its machine direction (MD) and 224 MPa in its transverse direction (TD).

Then, the biaxially stretched film was dry-laminated on a 30 μm-thick film made of linear low-density polyethylene (hereinafter occasionally referred to merely as "LLDPE") through a polyurethane adhesive to obtain a multi-layer film having a four layer structure constituted of a nylon 6 layer (5 μm), a polyamide resin composition E13 layer (5 μm), a nylon 6 layer (5 μm) and a LLDPE layer (30 μm). The multi-layer film was formed into a three side-sealed bag having a size of 18 cm×24 cm in which boiled carrot together with its broth were then filled. The bag was heat-sealed along an open side thereof to form a closed bag containing substantially no air. The obtained package was preserved in a constant-temperature oven maintained at 23° C. for 30 days, and then a color of the carrot preserved was examined. As a result, it was confirmed that the carrot exhibited a color substantially identical to that before sealed.

COMPARATIVE EXAMPLE 15

A biaxailly stretched film was produced by the same method as in Example 14 except for using the polyamide resin composition C13 obtained in Comparative Example 13. As a result of the measurement, it was confirmed that the obtained biaxailly stretched film had a thickness of about 15 μm and exhibited an oxygen permeability of 8.1 ml/m$^2$·atm·day and tensile strengths of 231 MPa in its machine direction (MD) and 222 MPa in its transverse direction (TD).

Then, the biaxailly stretched film was laminated on a LLDPE film to prepare a multi-layer film having a four layer structure constituted of a nylon 6 layer (5 μm), a polyamide resin composition C13 layer (5 μm), a nylon 6 layer (5 μm) and a LLDPE layer (30 μm) and then the multi-layer film was formed into a four side sealed bag enclosing carrot therein, by the same method as in Example 14. The thus obtained package was subjected to preservation test for the carrot by the same method as in Example 14. As a result, it was confirmed that the carrot after the preservation test exhibited faded red color.

From the above results, it was confirmed that the multi-layer film obtained in Example 14 in which the polyamide resin composition having a good oxygen absorbing property was used, exhibited a gas barrier property higher by 2 times or more than that produced in Comparative Example 13 in which the polyamide having no oxygen absorbing property was used, as well as good mechanical properties identical thereto. In addition, it was confirmed that the packaging container prepared using such a multi-layer film was excellent in keeping property for contents thereof.

According to the process of the present invention, the oxygen absorbing polyamide resin composition exhibiting an excellent oxygen absorbing property and containing the transition metal compound uniformly dispersed therein is produced without reduction in polycondensation reaction rate and molecular weight of polyamide.

Further, the oxygen absorbing polyamide resin composition having a stable quality is readily produced using conventional polyamide production apparatuses.

In addition, the packaging materials and packaging containers produced using the oxygen absorbing polyamide resin composition of the present invention also exhibit an excellent gas barrier property as well as excellent mechanical properties and, therefore, have a high product value and industrial advantages as compared to conventional ones.

What is claimed is:

1. A process for producing an oxygen absorbing polyamide resin composition by subjecting a diamine component containing 70 mol % or higher of m-xylylenediamine with a dicarboxylic acid component containing 50 mol % or higher of adipic acid to polycondensation reaction in the presence of a phosphorus compound, said process further comprising:

adding a compound or complex containing at least one metal selected from the group consisting of transition metals of Group VIII of the Periodic Table, manganese, copper and zinc to reaction system either prior to initiation of the polycondensation reaction or during the polycondensation reaction such that a ratio (P/M) of a concentration of phosphorus P (mmol/g) in the phosphorus compound contained in the polyamide resin composition to a concentration of the metal M (mmol/g) in the polyamide resin composition is 0.02 to 1.0.

2. The process according to claim 1, wherein the phosphorus compound is added such that the phosphorus concentration P in the polyamide resin composition is $3.2\times10^{-5}$ to $1.2\times10^{-2}$ mmol/g.

3. The process according to claim 2, wherein the phosphorus concentration is $1.0\times10^{-4}$ to $1.0\times10^{-2}$ mmol/g.

4. The process according to claim 1, wherein the metal concentration M in the polyamide resin composition is $1.7\times10^{-4}$ to $1.2\times10^{-2}$ mmol/g.

5. The process according to claim 1, wherein the difference between an end carboxyl group concentration [COOH] and an end amino group concentration [$NH_2$] ([COOH]−[$NH_2$]) is 8 to 82 μeq/g, and the polyamide resin has an number-average molecular weight of 15,000 to 45,000.

6. The process according to claim 1, wherein the phosphorus compound is at least one compound selected from the group consisting of phosphoric acid salts, phosphorous acid salts and hypophosphorous acid salts of alkali metals or alkali earth metals.

7. The process according to claim 1, wherein the compound or complex containing the metal is at least one selected from the group consisting of carboxylic acid salts, halides and acetylacetonate complexes of the metal.

8. The process according to claim 1, wherein the compound or complex containing the metal is at least one selected from the group consisting of acetic acid salts and acetylacetonate complexes of cobalt.

9. The process according to claim 1, wherein the polycondensation reaction is conducted while controlling an oxygen concentration in a gas phase in the polycondensation reaction system to 1% by volume or lower.

10. The process according to claim 1, further comprising the step of subjecting the oxygen absorbing polyamide resin composition as produced to solid-phase polymerization at a temperature not less than a glass transition point but less than a melting point of the polyamide using a batch heat polymerizer.

11. The process according to claim 1, wherein said ratio is 0.025 to 0.95.

12. The process according to claim 1, wherein said ratio is 0.03 to 0.9.

13. An oxygen absorbing polyamide resin composition produced by subjecting a diamine component containing 70 mol % or higher of m-xylylenediamine and a dicarboxylic acid component containing 50 mol % or higher of adipic acid to polycondensation reaction in the presence of a phosphorus compound, wherein a compound or complex containing at least one metal selected from the group consisting of transition metals of Group VIII of the Periodic Table, manganese, copper and zinc is also added to reaction system either before initiation of the polycondensation reaction or during the polycondensation reaction such that a ratio (P/M) of a concentration of phosphorus P (mmol/g) in the phosphorus compound contained in the polyamide resin composition to a concentration of the metal M (mmol/g) in the polyamide resin composition is 0.02 to 1.0.

14. The oxygen absorbing polyamide resin composition according to claim 13, wherein the phosphorus compound is added such that the phosphorus concentration P in the polyamide resin composition is $3.2\times10^{-5}$ to $1.2\times10^{-2}$ mmol/g.

15. The oxygen absorbing polyamide resin composition according to claim 14, wherein the phosphorus concentration is $1.0\times10^{-4}$ to $1.0\times10^{-2}$ mmol/g.

16. The oxygen absorbing polyamide resin composition according to claim 13, wherein the metal concentration M in the polyamide resin composition is $1.7\times10^{-4}$ to $1.2\times10^{-2}$ mmol/g.

17. The oxygen absorbing polyamide resin composition according to claim 13, wherein the phosphorus compound is at least one compound selected from the group consisting of phosphoric acid salts, phosphorous acid salts and hypophosphorous acid salts of alkali metals or alkali earth metals.

18. The oxygen absorbing polyamide resin composition according to claim 13, wherein the metal is cobalt.

19. The oxygen absorbing polyamide resin composition according to claim 13, which is made into a packaging material.

20. The oxygen absorbing polyamide resin composition according to claim 13, which is made into a packaging container.

21. The oxygen absorbing polyamide resin composition according to claim 13, wherein said ratio is 0.025 to 0.95.

22. The oxygen absorbing polyamide resin composition according to claim 13, wherein said ratio is 0.03 to 0.9.

* * * * *